United States Patent [19]

Marcinko et al.

[11] Patent Number: 5,554,438
[45] Date of Patent: Sep. 10, 1996

[54] SELF-RELEASE BINDER SYSTEM

[75] Inventors: Joseph J. Marcinko, Mullica Hill, N.J.; John R. Robertson, Glen Mills, Pa.

[73] Assignee: Imperial Chemical Industries, PLC, London, United Kingdom

[21] Appl. No.: 278,781

[22] Filed: Jul. 22, 1994

[51] Int. Cl.$^6$ .............................. C08K 5/01; C08K 5/09; C08L 91/08
[52] U.S. Cl. .................... 428/306.6; 428/311.7; 524/300; 524/322; 524/478
[58] Field of Search ...................................... 524/300, 322, 524/478; 428/306.6, 311.7

[56] References Cited

U.S. PATENT DOCUMENTS

| | | | |
|---|---|---|---|
| 3,870,665 | 3/1975 | Diehr et al. | 260/17.2 |
| 4,028,120 | 6/1977 | Emond | 106/38.24 |
| 4,110,397 | 8/1978 | Wooler | 264/338 |
| 4,257,996 | 3/1981 | Farrissey, Jr. et al. | 264/122 |
| 4,396,673 | 8/1983 | Ball et al. | 428/326 |
| 4,431,455 | 2/1984 | Brown et al. | 106/245 |
| 4,609,513 | 9/1986 | Israel | 264/122 |
| 4,772,442 | 9/1988 | Trout et al. | 264/109 |
| 4,905,518 | 3/1990 | Kubler | 73/654 |
| 4,933,232 | 6/1990 | Trout et al. | 428/288 |

FOREIGN PATENT DOCUMENTS

| | | |
|---|---|---|
| 1176778 | 10/1984 | Canada . |
| 0039137 | 11/1981 | European Pat. Off. . |
| 2552236 | 7/1976 | Germany . |
| 58-036430 | 3/1983 | Japan . |
| 60-030306 | 2/1985 | Japan . |

*Primary Examiner*—Thomas Hamilton, III

[57] ABSTRACT

A self-release binder system comprising (a) an organic polyisocyanate binder; and (b) a composition comprising (i) a wax and (ii) a fatty acid.

11 Claims, No Drawings

SELF-RELEASE BINDER SYSTEM

FIELD OF THE INVENTION

The present invention is directed to binder systems suitable for use in the manufacture of molded articles from lignocellulosic materials. More specifically, the present invention is directed to self-release binder systems.

BACKGROUND OF THE INVENTION

Organic polyisocyanates have long been used as binders for lignocellulosic materials in the manufacture of sheets or molded bodies, such as chipboard, fiberboard and plywood. Although such organic polyisocyanates have excellent adhesive properties, they have the disadvantage of causing severe sticking of the lignocellulosic materials to metal surfaces contacted during pressing, such as the platens of the press. Such sticking may harm the end product and the necessary cleaning of the metal surfaces is both time-consuming and costly.

Attempts have been made to overcome the adhesion problem caused by polyisocyanate binders. For example, efforts have been made to use the polyisocyanates only in the core of the molded products and to replace the polyisocyanates with phenolic resin binders at the surface. Phenolic resin binders cause less adhesion of the lignocellulosic material to the metal surfaces of the press, however, they are inferior to isocyanates in their adhesive properties and have a relatively slow rate of reaction.

Also, attempts have been made to improve the release characteristics of organic polyisocyanate binders in order to decrease or eliminate the adhesion problem through the use of internal and external release agents. Internal release agents used within the polyisocyanate binder to decrease the adhesion problem include organic phosphates, as disclosed in U.S. Pat. No. 4,257,996. External release agents include metallic soaps, such as those disclosed in U.S. Pat. No. 4,110,397.

Various acids or salts of acids have also been incorporated into polyisocyanate binders in an attempt to increase the release capabilities thereof. For example, U.S. Pat. No. 3,870,665 discloses a process for molding lignocellulosic materials with a polyisocyanate. A catalyst for promoting isocyanurate formation is included within the isocyanate to effect release. The catalyst may be a fatty acid, such as a coconut fatty acid. U.S. Pat. Nos. 4,905,518 and 4,609,513 disclose liquid binders comprising polyisocyanates and acids or acid esters. U.S. Pat. Nos. 4,933,232 and 4,772,442 disclose a process for producing shaped articles utilizing a binder/release system comprising an isocyanate and a polymeric fatty acid. Although effective in improving the release characteristics of the organic polyisocyanate, the inclusion of acids such as fatty acids directly into the isocyanate binder has been unsatisfactory due to stability problems. Namely, when used in the amounts necessary to provide adequate release activity, the acids have been found to react directly and immediately with the polyisocyanate resulting in an unstable and unusable system.

Various waxes have also been combined with polyisocyanate binders to provide improved release. For example, U.S. Pat. No. 4,396,673 discloses the use of a mixture of an organic polyisocyanate and a wax release agent to prepare sheets or molded bodies from lignocellulosic materials. U.S. Pat. No. 4,431,455 discloses the use of an organic polyisocyanate and a mixture of a wax and liquid ester to promote release of lignocellulosic material from press plates. However, such approaches have proven to be unsatisfactory as they require the use of special solvents and/or emulsifiable isocyanates. In general, wax release agents are disadvantageous as a layer of the wax is always left on the surface of the composite which can adversely affect the physical characteristics of the composite.

SUMMARY OF THE INVENTION

Accordingly, it is an object of the present invention to provide a self-release binder system for use in preparing composites from lignocellulosic materials which provides excellent adhesion while allowing for adequate release of the lignocellulosic material from the metal surfaces of the pressing equipment.

It is a further object of the present invention to provide a self-release binder system which does not have the stability problems found in conventional systems.

These objectives are obtained by the present invention which is directed to a self-release binder system comprising: (a) an organic polyisocyanate; and (b) a composition comprising (i) a wax and (ii) a fatty acid.

The present invention is further directed to a process for preparing molded articles from lignocellulosic materials which comprises:

applying to the lignocellulosic material a self-release binder system comprising (a) an organic polyisocyanate and (b) a composition comprising (i) a wax and (ii) a fatty acid; and pressing lignocellulosic material for a time and at a temperature sufficient to cause bonding.

DETAILED DESCRIPTION OF THE INVENTION

The organic polyisocyanates useful in the present invention are those having a number average isocyanate functionality in the range of from about 1.8 to about 4.0. Preferably, the number average isocyanate functionality of the organic polyisocyanate is from about 2 to about 3.

The organic polyisocyanates which may be used in the present binder compositions include any of the aliphatic, cycloaliphatic, aralaliphatic, or aromatic polyisocyanates known in polyurethane or polyurea chemistry, especially those which are liquid at room temperature. Examples of suitable polyisocyanates include: 1-6-hexamethylene diisocyanate, isophorone diisocyanate, cyclohexane 1,4-diisocyanate, 4,4'-dicyclohexol methane diisocyanate, 1,4-xylylene diisocyanate, 1,4-phenylene diisocyanate, 2,4-toluene diisocyanate, 2,6-toluene diisocyanate, 4,4'-diphenylmethane diisocyanate (4,4' MDI) 2,4'-diphenylmethane diisocyanate (2,4' MDI), polymethylene polyphenylene polyisocyanates (crude MDI) and 1,5-naphthylene diisocyanate. Mixtures of isocyanates and polyisocyanates which have been modified by the introduction of urethane, allophanate, urea, biuret, carbodiimide, uretonimine, or isocyanurate residues can also be used.

In general, the aromatic polyisocyanates are preferred in the binder systems of the present invention. The most preferred aromatic polyisocyanates are 4,4'-diphenylmethane diisocyanate, 2,4'-diphenylmethane diisocyanate, polymeric MDI, MDI variants and mixtures thereof. Suitable MDI variants include compounds in which the MDI has been modified by the introduction of urethane, aliphatic, urea, biuret, amide, carbodiimide, uretonimine or isocyanurate residues.

Isocyanate-terminated prepolymers may be also be employed and are prepared by reacting an excess of a polymeric or pure polyisocyanate with polyols, including aminated polyols, pure polyisocyanate including polyols including animated polyols, imine or enamine polymers, polyether polyols, polyester polyols or polyamines. Psuedoprepolymers may also be employed. A psuedoprepolymer is a mixture of a prepolymer and one or more monomeric di- or polyisocyanates.

Preferably the polyisocyanate is a polymeric polyisocyanate and most preferably a polymeric diphenylmethane diisocyanate. Commercially available polymeric polyisocyanates useful in the present invention include Rubinate® M, Rubinate® MF-1840 and Rubiflex® 26A, both available from ICI Americas Inc. of Wilmington, Del.

The present self-release binder compositions comprise about 60 to about 99 and preferably about 75 to about 90 weight percent of the organic polyisocyanate component.

The fatty acids which are useful in the present invention include any naturally occurring or synthetically manufactured saturated or unsaturated monobasic, di-basic or polybasic fatty acid. Preferably, the fatty acids utilized in the present self-release binder systems are those which comprise an acid having an aliphatic chain of about 8 to about 24 carbon atoms. Preferably, the fatty acid is one having an aliphatic chain of about 8 to about 20 and most preferably about 16 to about 18 carbon atoms. Examples of preferred fatty acids useful in the present invention are stearic acid, oleic acid, lauric acid, myristic acid, palmitic acid, linoleic acid, linolenic acid and mixtures thereof. Most preferably the fatty acid used in the present binder systems is oleic acid.

Metallic fatty acids have also been found to be useful in the present self-release binder compositions. Preferred metallic fatty acids are those which comprise an acid having an aliphatic chain of about 4 to about 24 carbon atoms and preferably about 12 to about 20, such as oleic acid, stearic acid, lauric acid, myristic acid, palmitic acid, linoleic acid and linolenic acid. Any metallic compound may be used to form the acid salt. Examples of suitable metallic compounds include aluminum, barium, calcium, lithium, magnesium, potassium, sodium and zinc. The most preferred metallic compound is zinc.

The amount of the fatty acid in component (b), i.e., the wax/fatty acid composition, may be from about 25 to about 75 and most preferably, about 50% by weight. In its most preferred form, the wax/fatty acid composition is a 50:50 blend.

The fatty acid is combined with a wax, and this composition is combined with the organic polyisocyanate to form the self-release binder systems of the present invention. Various types of waxes may be used to accommodate the fatty acid useful in the present invention. The wax used in the present systems must be compatible with both the fatty acid and the organic polyisocyanate in order to solubilize the fatty acid and result in a stable system when combined with the organic polyisocyanate. Historically, sizing waxes, such as hydrocarbon waxes, paraffin waxes or emulsions of hydrocarbon waxes have been added to lignocellulosic materials in order to increase the water resistance of the lignocellulosic material. Accordingly, it is preferred, from the standpoint of convenience, to incorporate the fatty acid directly into an appropriate sizing wax.

Suitable waxes for use in the present invention include petroleum hydrocarbon waxes, e.g., Indrawax® 001, Indrawax® 003 and Indrawax® 6040 available from Industrial Raw Materials and emulsified hydrocarbon waxes, e.g., Paracol-810-N, available from Hercules Incorporated. Most preferably, the wax used in the present system is a paraffin wax. The wax may further have incorporated therein one or more release waxes such as montan wax. Typical concentrations of the wax in component (b) are about 75 to about 25% and preferably about 50% by weight.

Additional materials may be included in the wax/fatty acid component. For example, catalysts, surfactants, fire retardants and biocides may all be added to the wax/fatty acid composition. Examples of suitable catalysts include tertiary amine catalysts such as Niax® A-4 available from Union Carbide and Texacat® and Thancat® DMDEE available from Texaco and conventional polyurethane catalysts such as Polycat® DBU available from Air Products and Dabco catalysts also available from Air Products. Commercially available surfactants such as the Synperonic® and Tetronic® series of surfactants available from BASF, which are tetrafunctional block copolymers of propylene oxide, ethylene oxide and ethylenediamine, may also be added to the wax/fatty acid composition. When these additional components are incorporated into the wax/fatty acid composition, they are utilized in amounts of about 0.01 to about 15% and preferably, about 0.05 to about 5%.

The wax/fatty acid component (i.e., component (b)) comprises about 40 to about 1 and preferably about 25 to about 10 weight % of total amount of the present binder compositions.

In the most preferred form of the present invention, the organic polyisocyanate also contains a separate release agent independent of the wax/fatty acid composition to further improve the release capabilities of the system. Examples of suitable release agents include fatty acids and silicones. Most preferably, this release agent is also a fatty acid such as those known for use in combination with organic polyisocyanates. Preferred fatty acids are the Emersol® 6333 and 6321 oleic acid available from Henkel Corp. Typical amounts of fatty acids release agent utilized directly in the organic polyisocyanate binder are from about 1 to about 30% and preferably about 10 to about 20% by weight. Suitable fatty acids include oleic acid and oleic fatty/acid blends wherein the oleic acid is the primary component. The most preferred fatty acid for use directly in the organic polyisocyanate is oleic acid.

The present self-release binder systems may be prepared by conventional methods which will be evident to one of ordinary skill in the art from the present disclosure. For example, the wax/fatty acid composition may be prepared by simply melting the wax and the fatty acid (if the fatty acid is a solid) and mixing these components together by any appropriate means. The wax/fatty acid composition will then be placed into an appropriate vessel for application to the lignocellulosic material. As noted above, emulsified wax systems may be also be used in the wax/fatty acid component of the present systems. In this instance, the fatty acid is either blended with the emulsifiable wax or is first emulsified itself and then blended with the emulsifiable wax and placed in an appropriate vessel for application to the lignocellulosic material.

The organic polyisocyanate binder (with or without the additional release agent) may be prepared by conventional methods which will also be evident to one skilled in the art from the present disclosure. The organic polyisocyanate binder component is also placed into an appropriate vessel for application to the lignocellulosic material.

The method for preparing molded articles from lignocellulosic materials according to the present invention comprises applying the organic polyisocyanate binder and the wax/fatty acid composition directly to the lignocellulosic materials and pressing the treated lignocellulosic materials for a time and at a temperature and pressure sufficient to cause bonding. In general, the materials are applied to the lignocellulosic materials separately, with the wax/fatty acid component being applied first. However, under appropriate conditions, the components may be applied simultaneously. Generally, the materials are applied to the lignocellulosic material by atomization or via a spinning disc applicator. The typical loading of the wax/fatty acid composition onto the lignocellulosic material is about 1 to about 3% and preferably about 1 to about 2% by weight. The typical loading of the organic polyisocyanate is about 1 to about 10% and preferably about 2 to about 6% by weight.

After treatment with the present binder system, the lignocellulosic material is then formed into a mat and placed onto the metal platens of a suitable press. The treated lignocellulosic material is pressed for an appropriate time and at temperature and pressure sufficient to yield a board of a defined size and density. Pressing temperatures may range from about 121° C. to about 260° C. The material may be pressed for a time period of about 10 sec/16th in. to about 30 sec/16th in. Pressure requirements vary according to the particular composite being prepared. However, in general, pressures of about 500 psi to about 1500 psi may be used.

The self-release binder systems of the present invention may be used to bond numerous types of lignocellulosic materials. Preferably, the present systems are used to bond multiple wood substrates to prepare engineering lumber products. It is preferred that at least one of the substrates be selected from the following group: wood chips or fibers, paper, rice hulls, grass, cornhusks, bagasse, sawdust, cork, etc. The lignocellulosic materials are used to prepare products such as plywood, laminated veneer lumber, waferboard, particleboard, fiberboard, chipboard and oriented wood products.

The present invention will now be illustrated with reference to the following Examples.

Example 1

A wax/fatty acid composition was prepared by first melting 200 g of Indrawax® 001 petroleum hydrocarbon wax available from Industrial Raw materials. The melted wax was then combined with 200 g of MO5 oleic acid available from Witco Chemical in a static blender, i.e., at a 1:1 ratio. This combination was mixed for 2 minutes at 100° C.

The polyisocyanate binder was prepared by combining 425 g of Rubinate® MF-1840 isocyanate available from ICI Americas with 75 g of MO5 oleic acid in a static blender. This combination was mixed for 2 minutes at 25° C.

The wax/fatty acid composition was applied to 5.5 kg of mixed wafers containing Virginia Pine, Yellow Pine, Gum and White Oak wafers via an air atomizer available from Spraying Systems—Robert Miller Association. The wax/oleic acid composition was then applied to the wafers at a loading of 1.25%. The polyisocyanate binder prepared above was then applied to the lignocellulosic wafers via air atomization at a loading of 2.0%.

The treated wafers were then formed into a mat using a sufficient amount of wafers to form an 11"×11"×7/16" board having a density of 39 pcf. The mat was placed on the metal platens of a Lawton press machine. The mat was then pressed at a temperature of 204° C. for 20 sec./16th in. at 750 psi.

The release provided by the present compositions on 21 consecutive runs was analyzed and the results are set forth in Table 1. The results are quantified as follows based upon the amount of lignocellulosic material sticking to the platens of the press: 5=perfect (no sticking); 4= excellent (no sticking but slightly more difficult to remove); 3= more transfer of lignocellulosic material; 2= some local sticking; 1= complete sticking.

TABLE 1

| Board Number | Release Result Bottom Platen | Release Result Top Platen |
|---|---|---|
| 1 | 4 | 5 |
| 2 | 5 | 5 |
| 3 | 5 | 5 |
| 4 | 5 | 5 |
| 5 | 5 | 5 |
| 6 | 5 | 5 |
| 7 | 5 | 5 |
| 8 | 5 | 5 |
| 9 | 5 | 5 |
| 10 | 5 | 4 |
| 11 | 5 | 5 |
| 12 | 5 | 5 |
| 13 | 5 | 5 |
| 14 | 5 | 4 |
| 15 | 5 | 5 |
| 16 | 5 | 4 |
| 17 | 5 | 5 |
| 18 | 5 | 5 |
| 19 | 4 | 5 |
| 20 | 5 | 4 |
| 21 | 5 | 5 |

Example 2

A 1:1 wax/fatty acid composition was prepared by combining 200 g of Indrawax® 001 petroleum hydrocarbon wax with 200 g of stearic acid available from Witco Chemical in the manner set forth in Example 1.

A binder was prepared by combining 425 g of Rubinate® MF-1840 and 75 g of MO5 oleic acid in the manner set forth in Example 1.

The wax/acid composition was applied to 5.5 kg of the mixed wafers identified in Example 1 by air atomization at a loading of 1.25%. The isocyanate composition was then applied to the wafers with a Coil Industries spinning disc head at a loading of 2.0%.

A sufficient quantity of treated wafers were placed on the platens of a Lawton press to provide a 11"×11"×¼" board having a density of 39 pcf. The mat was pressed at a temperature of 232° C. for 20 sec/16th in. at 750 psi.

A fifty board run was made and the platens were analyzed for release in the manner described in Example 1. The results are set forth below in Table 2.

TABLE 2

| Board Number | Release Result Bottom Platen | Release Result Top Platen |
|---|---|---|
| 1 | 5 | 5 |
| 2 | 5 | 5 |
| 3 | 5 | 5 |
| 4 | 5 | 5 |
| 5 | 5 | 5 |
| 6 | 5 | 5 |
| 7 | 5 | 5 |
| 8 | 4 | 5 |
| 9 | 5 | 5 |

TABLE 2-continued

| Board Number | Release Result Bottom Platen | Release Result Top Platen |
| --- | --- | --- |
| 10 | 5 | 5 |
| 11 | 5 | 5 |
| 12 | 5 | 5 |
| 13 | 5 | 5 |
| 14 | 5 | 5 |
| 15 | 5 | 4 |
| 16 | 5 | 5 |
| 17 | 5 | 5 |
| 18 | 5 | 5 |
| 19 | 5 | 5 |
| 20 | 5 | 5 |
| 21 | 5 | 5 |
| 22 | 5 | 5 |
| 23 | 5 | 5 |
| 24 | 5 | 5 |
| 25 | 5 | 5 |
| 26 | 5 | 5 |
| 27 | 5 | 5 |
| 28 | 5 | 5 |
| 29 | 5 | 5 |
| 30 | 5 | 5 |
| 31 | 5 | 5 |
| 32 | 5 | 5 |
| 33 | 5 | 5 |
| 34 | 5 | 5 |
| 35 | 5 | 5 |
| 36 | 5 | 5 |
| 37 | 5 | 5 |
| 38 | 5 | 5 |
| 39 | 5 | 5 |
| 40 | 5 | 5 |
| 41 | 5 | 5 |
| 42 | 5 | 5 |
| 43 | 5 | 5 |
| 44 | 5 | 5 |
| 45 | 5 | 5 |
| 46 | 5 | 5 |
| 47 | 5 | 5 |
| 48 | 5 | 5 |
| 49 | 5 | 5 |
| 50 | 5 | 5 |

As can be seen in both Examples 1 and 2, the compositions of the present invention provide excellent release of the treated lignocellulosic material from the platens of the press. The Industrial Board Strength of the samples was 125 psi. Therefore, the physical characteristics of the boards produced in both Examples were excellent.

Example 3

A wax/fatty acid composition was prepared by melting 300 g of Indrawax® 001. The melted wax was then combined with 300 g of M05 oleic acid available from Witco Chemical in a static blender, i.e., a 1:1 mixture. This combination was mixed for 2 minutes at 100° C. 150 g of Rubinate® MF-1840 was used as the binder.

The wax/fatty acid blend was applied to 5.5 kg of Aspen wafers via air atomization using the atomizer described in Example 1. The wax/oleic acid system was applied at a loading of 1.0%. The Rubinate® MF-1840 binder was then applied to the wafers via air atomization at a loading of 2.0%.

The treated wafers were then formed into a mat using a sufficient amount of wafers to form an 11"×11"×¼" board having a density of 39 pcf. The mat was then placed in the metal platens of a Lawton press. The mat was then pressed at a temperature of 199° C. for 25 sec. at 750 psi.

The release provided by this composition on 3 consecutive runs is set forth in Table 3.

TABLE 3

| Board Number | Release Result |
| --- | --- |
| 1 | 3 |
| 2 | 2 |
| 3 | 2 |

The experiment was then repeated, this time using a wax/oleic acid component prepared from 400 g of oleic acid and 200 g of Indrawax® 001, i.e., a 2:1 mixture.

The release provided by this composition on 10 consecutive runs was analyzed and the results set forth in Table 4.

TABLE 4

| Board Number | Release Result |
| --- | --- |
| 1 | 3 |
| 2 | 3 |
| 3 | 3 |
| 4 | 3 |
| 5 | 3 |
| 6 | 3 |
| 7 | 3 |
| 8 | 3 |
| 9 | 2 |
| 10 | 2 |

As can be seen from Tables 3 and 4, the addition of the wax/fatty acid blend improved the release provided by isocyanate binders which do not contain a separate release agent.

The present invention may be embodied in other specific forms without departing from the spirit or essential attributes thereof and, accordingly, reference should be made to the appended claims, rather than to the foregoing specification as indicating the scope of the invention.

What is claimed is:

1. A multi-component self-release binder system for use in the manufacture of molded articles comprising (a) an organic polyisocyanate binder as a first component; and (b) a composition comprising (i) a wax and (ii) a fatty acid as a second component, wherein component (a) and component (b) are applied separately to the material to be molded.

2. A self-release binder system as in claim 1, wherein the polyisocyanate is selected from the group consisting of 4,4'-diphenylmethane diisocyanate, 2,4'-diphenylmethane diisocyanate, polymeric MDI, and MDI variants.

3. A self-release binder system as in claim 1, wherein the fatty acid comprises an aliphatic chain of 8 to 24 carbon atoms.

4. A self-release binder system as in claim 3, wherein the fatty acid is selected from the group consisting of stearic acid, oleic acid, lauric acid, myristic acid, palmitic acid, linoleic acid, linolenic acid and mixtures thereof.

5. A self-release binder composition as in claim 3, wherein the fatty acid is a metallic fatty acid.

6. A self-release binder composition as in claim 5, wherein the metallic fatty acid is the metal salt of a fatty acid selected from the group consisting of oleic acid, stearic acid, lauric acid, myristic acid, palmitic acid, linoleic acid, linolenic acid.

7. A self-release binder system as in claim 6 wherein the metal salt comprises a metal selected from the group consisting of aluminum, barium, calcium, lithium, magnesium, potassium, sodium and zinc.

8. A self-release binder system as in claim 1, wherein the wax is selected from the group consisting of montan wax, petroleum hydrocarbon wax and emulsified hydrocarbon wax.

9. A self-release binder system as in claim 1, comprising 25 to 75% by weight of the fatty acid based on the total weight of (b).

10. A self-release binder system as in claim 9, comprising 50% by weight of the fatty acid based on the total weight of (b).

11. A self-release binder system as in claim 1, further comprising an additive selected from the group consisting of catalysts, surfactants, fire retardants and biocides.

* * * * *